United States Patent
Chen et al.

(10) Patent No.: US 8,255,498 B2
(45) Date of Patent: Aug. 28, 2012

(54) ROUTER AND METHOD FOR AVOIDING IP ADDRESS CONFLICTS

(75) Inventors: Yun-Ti Chen, Taipei (TW); Feng-Che Liu, Taipei (TW); Chi-Chung Chen, Taipei (TW); Tien-So Huang, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 203 days.

(21) Appl. No.: 12/385,680

(22) Filed: Apr. 16, 2009

(65) Prior Publication Data
US 2010/0211659 A1 Aug. 19, 2010

(30) Foreign Application Priority Data

Feb. 18, 2009 (TW) .............................. 98105189 A

(51) Int. Cl.
*G06F 15/177* (2006.01)
(52) U.S. Cl. ........ 709/221; 709/220; 709/223; 709/228; 370/392; 370/395.54
(58) Field of Classification Search .................. 709/220, 709/221, 223, 228; 370/392, 395.54
See application file for complete search history.

(56) References Cited

U.S. PATENT DOCUMENTS

| 7,403,997 B2* | 7/2008 | Wang et al. | 709/228 |
| 2006/0047835 A1* | 3/2006 | Greaux | 709/229 |
| 2007/0133544 A1* | 6/2007 | Shida | 370/392 |
| 2009/0006635 A1* | 1/2009 | Siegmund | 709/228 |

FOREIGN PATENT DOCUMENTS

TW  I227614  2/2005

* cited by examiner

*Primary Examiner* — Yves Dalencourt
(74) *Attorney, Agent, or Firm* — Chung-Ming Shih

(57) ABSTRACT

A method for avoiding the IP address conflict includes the following steps. First, once the router obtains an IP address as its WAN IP address, the network bits of the WAN IP address and the network bits of an IP pool of the router are retrieved. Then, it follows to determine whether the network bits of the WAN IP address is identical to that of the IP pool, and if yes, modify the network bits of the IP pool together with a LAN IP address of the router to be different from that of the WAN IP address. After that, an instruction is transmitted to the client terminals associated with the router. Upon reception of the instruction, the client terminals replace the old IP addresses with the new IP addresses assigned from the router in accordance with Dynamic Host Configuration Protocol.

1 Claim, 3 Drawing Sheets

ROUTER AND METHOD FOR AVOIDING IP ADDRESS CONFLICTS

BACKGROUND OF INVENTION

1. Field of Invention

This invention generally relates to the field of IP address allocation on a network. More particularly, this invention relates to a router and a method for avoiding IP addresses conflicts.

2. Related Prior Art

In a local area network (LAN), each of the machines, such as a computer, a printer, a scanner, a router and so on, is assigned with a unique IP address by a router used on that Local Area Network. In general, there may be more than one router in one Local Area Network, if necessary.

FIG. 3 is a block diagram showing a network system using a conventional router 9. The router 9 includes two network interfaces. One is the wide area network (WAN) port 90 and the other is the local area network (LAN) port 91. Typically, the WAN port 90 includes a WAN IP address 901 and a Dynamic Host Configuration Protocol (DHCP) client 902. The LAN port 91 includes a LAN IP address 911, an IP pool 912, and a Dynamic Host Configuration Protocol (DHCP) server 913.

The WAN port 90 is configured to be connected to a top-level router 9a which is similar in configuration to the router 9. As such, the DHCP client 902 of the router 9 can interact with the top-level router 9a to obtain a lease of an IP address, such as "192.168.1.1", for the WAN IP address 901 in accordance with the Dynamic Host Configuration Protocol, a network application protocol used by devices (DHCP clients) to obtain configuration information for operation in an Internet Protocol network.

The IP pool 912 of the LAN port 91 is provided to be set up by an user and defines a list of non-overlapping IP address ranged in form of: from1-to 1, from 2-to2, . . . , from N-to N. For example, 192.168.2.0 to 192.168.2.9. This notation places periods between each of the four numbers (octets) that comprise an IP address. In this example, the first three numbers "192.168.2" are called the "network bits", as they represent the 'network' portion of each machine's address. The remaining number "0.0," "0.1", . . . , or "0.9" is known as the "host bits", as it represents the particular host machine on the network (i.e. in the range of addresses). Note that the IP addresses in the same IP pool have the network bits in common, whereas each of the IP addresses has unique the host bits.

The LAN IP address 911 of the router 9 has its own IP address selected from the IP pool 912. Typically, the router 9 uses the first IP address in the range as its LAN IP address 911 (i.e. 192.168.2.0 in this example). On the other hand, the DHCP server 913 are configured to allocate IP addresses to client terminals associated to the LAN port, such as a low-level router 9b, a laptop 9c and a personal computer 9d, in accordance with the Dynamic Host Configuration Protocol. Typically, when client terminals 9b, 9c, 9d are initialized, they request IP addresses from the DHCP server 913. The DHCP server 913 then allocates available IP addresses, such as 192.168.2.1 to 192.168.2.3, from the IP pool 912 to the client terminals 9b, 9c, 9d. The IP addresses are typically returned to the IP pool 912 after a lease time expires.

Normally, the network bits in the IP pool of the top-level router 9a (i.e. 192.168.1 in this example) differs from that of the mid-level router 9 (i.e. 192.168. 2). It is therefore that every IP address allocated from the top-level router 9a to the mid-level router 9 is addressed as "192. 168. 1. X" and is not going to be overlapped with those IP addresses "192. 168. 2. X" allocated from the mid-level router 9 to the low-level router 9b. However, if for any reason the top-level router 9a is shut down and then reboots again, the case may be totally different. That is, it may happen to have the IP addresses given out from the top-level router 9a identical to those given out from the mid-level router 9. More specifically, when the top-level router 9a is suddenly shut down and disconnected with the mid-level router 9, the IP allocation of the mid-level router 9 is not affected and still able to allocate an unused IP addresses of the IP pool 912, such as 192.168.2.4 to 192.168.2.9, in response to a location request message from a client terminal connected thereto. However, once after reboot, the top-level router 9a is reconnected with the mid-level router 9 and automatically allocates a new IP address to router 9 in accordance with the Dynamic Host Configuration Protocol. That is, the router 9 will replace the original IP address with the new IP address for the WAN IP address 901.

The problem is that after reboot, the top-level router 9a may inappropriately use the new network bits identical to that of the current IP pool of the router 9. For example, 192.168.2. This is so-called domain conflict, which occurs when two computers on a local network (or the Internet) have been assigned the same network bits. In this example, when the domain conflict occurs, the top-level router 9a may assign a new IP address, such as 192.168.2.1, from the range of 192.168.2.1 to 192.168.2.9, for the WAN IP address 902 of the router 9. The new IP address is therefore improperly overlapped with the one previously assigned to the low-level router 9b (i.e. 192.168.2.1 as well). In this event, the IP address conflict occurs since two machines, namely the mid-level router 9 and the low-level router 9b, on a local network have been assigned the same IP address. Note that the IP address conflict may further cause other unexpected problems later on.

One such system is described in Taiwan Patent No. 1227614, which discloses a method for dynamic host allocation. In the mechanism, a selected IP address to be assigned to a client terminal or machine will be checked before sent out in case the selected IP address is overlapped with the used IP addresses. Though it may be possible to ensure that the IP addresses allocated from a single router are not overlapped; however, the mechanism is incapable of ensuring whether the IP addresses allocated from more than one router still are not overlapped.

SUMMARY OF INVENTION

Broadly stated, the present invention is directed to a method of avoiding IP address conflict and a router using the method. It is therefore an object of the present invention to ensure no IP address conflict happened on a network where a plenty of routers are involved.

The router comprises a WAN port, a LAN port and a domain conflict prevention program. The WAN port includes a DHCP client and a WAN IP address. The DHCP client is capable of interacting with a DHCP device, such as a top-level router, to obtain a lease of an IP address for the WAN IP address in accordance with the Dynamic Host Configuration Protocol. The LAN port includes a LAN IP address, an IP pool, and a DHCP server. The DHCP server is capable of allocating IP addresses from the IP pool to one or more client terminals associated with the LAN port in accordance with the Dynamic Host Configuration Protocol. Additionally, the domain conflict prevention program is configured to modify the LAN IP address and the network bits of the IP pool of the LAN port when the network bits of the IP pool is identical to that of the WAN IP address and then to transmit an instruction to all of the client terminals associated with the LAN port.

The method includes the following steps. First, once the router obtains an IP address as its WAN IP address from a DHCP server, the network bits of the WAN IP address and the network bits of an IP pool of the router are retrieved. Then, it follows to identify whether the network bits of the WAN IP address is identical to that of the IP pool, and if yes, modify the network bits of the IP pool together with the LAN IP address of the router to be different from that of the WAN IP address. After that, an instruction is transmitted to the client terminals associated with the router. Upon reception of the instruction, the client terminals reset the IP address with the new IP addresses assigned from the router in accordance with Dynamic Host Configuration Protocol.

The present invention and the advantages thereof will become more apparent upon consideration of the following detailed description when taken in conjunction with the accompanying drawings.

BRIEF DESCRIPTION OF DRAWINGS

The invention is illustrated by the accompanying drawings in which corresponding parts are identified by the same numerals and in which.

DETAILED DESCRIPTION OF THE PREFERRED EMBODIMENT

Figure 1:
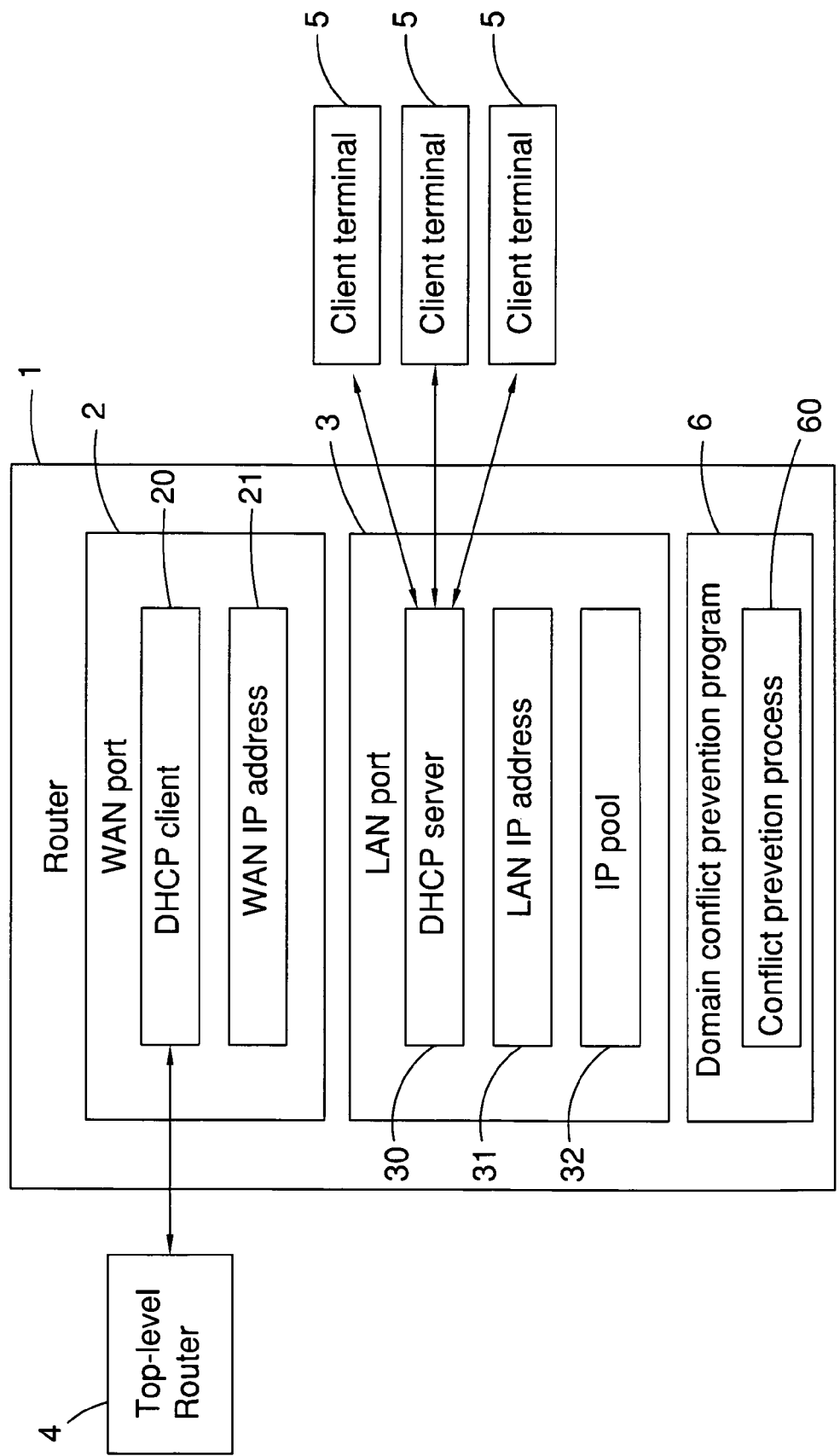
FIG. 1 is a block diagram illustrating a router on a network according to the preferred embodiment of the present invention.
Figure 2:
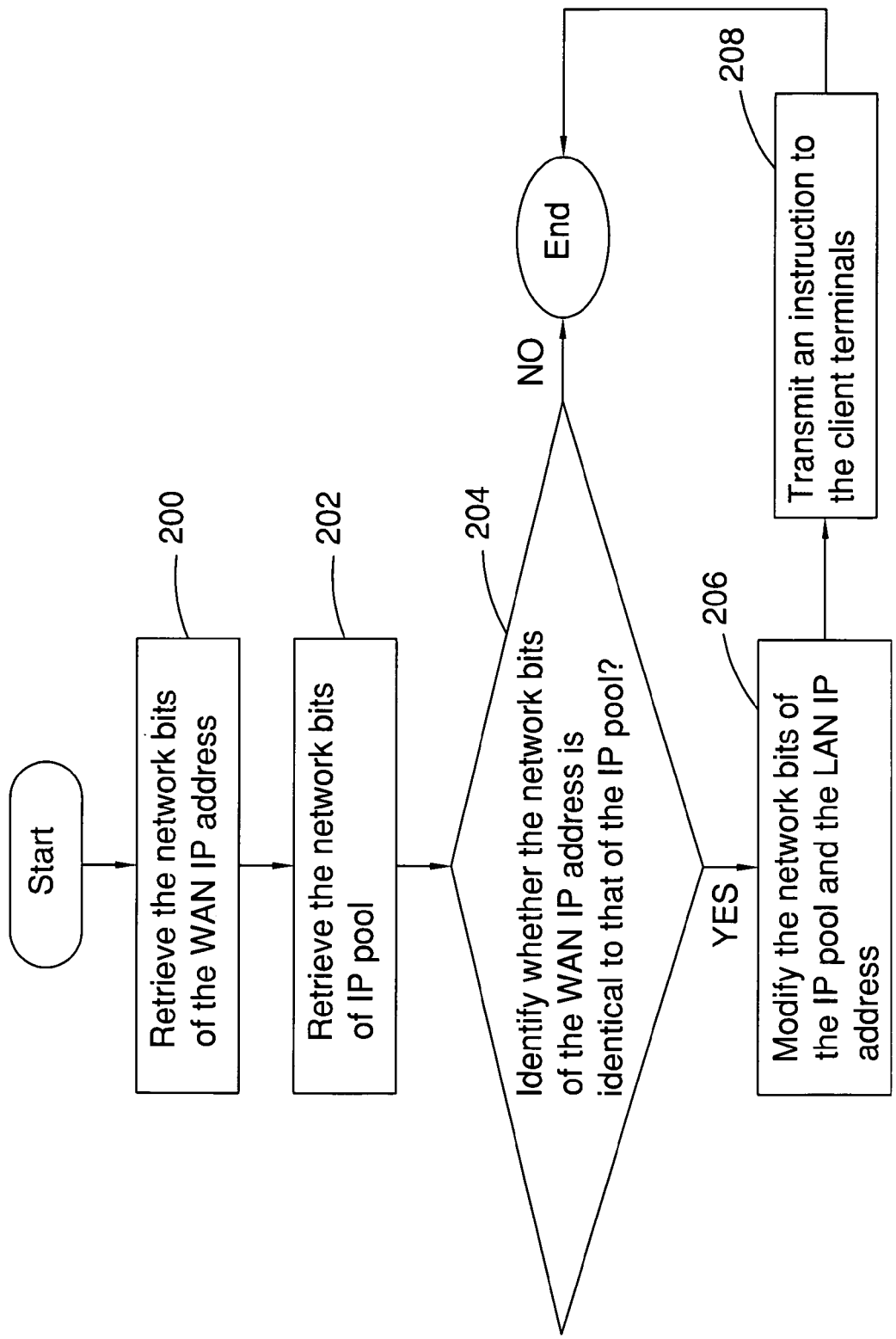
FIG. 2 is a flow diagram illustrating a method for avoiding the IP address conflict according to the preferred embodiment.
Figure 3:
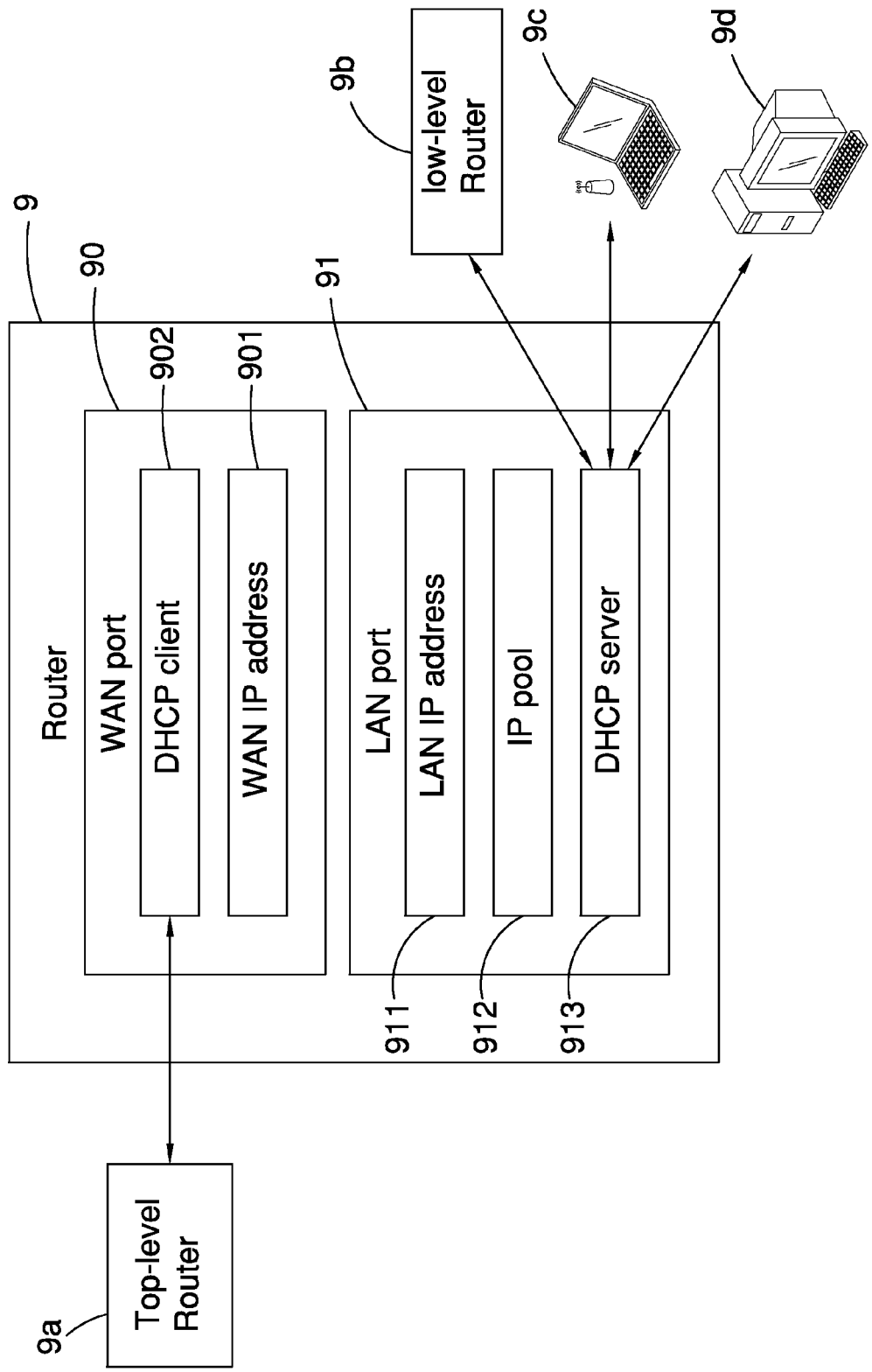
FIG. 3 shows a prior art of the conventional router.

Referring now to FIG. 1, the router 1 according to the preferred embodiment of the present invention includes two network interfaces in accordance with Dynamic Host Configuration Protocol. One is the wide area network (WAN) port 2 and the other is local area network (LAN) port 3. The WAN port 2 includes a DHCP client 20 and a WAN IP address 21. The LAN port 3 includes a DHCP server 30, a LAN IP address 31 and an IP pool 32. The aforementioned configuration of this embodiment is generally similar to that of the prior art and will not be discussed in detail for simplicity's sake.

The WAN port 2 is connected to a DHCP device 4, such as a top-level router. Typically, the top-level router 4 has the network interface identical to that of the router 1 so that the DHCP client 20 of the router 1 is allowed to interact with the top-level router 4 to obtain a lease of an IP address, such as 192.168.1.1., for the WAN IP address 21 in accordance with the Dynamic Host Configuration Protocol.

The LAN port 3 is connected with three or more client terminals 5, such as a low-level router and other computers. The client terminals 5 comply with the Dynamic Host Configuration Protocol. The IP pool 32 of the LAN port 3 is set up with ten IP addresses ranged from 192.168.2.0 to 192.168.2.9. Thus, the LAN IP address typically chooses the first IP address, namely 192.168.2.0, as its own IP address. The DHCP server 30 of the LAN port 3 are configured to allocate the remaining IP addresses, such as 192.168.2.1 to 192.168.2.3, from the IP pool 32 to the client terminals 5 associated with the LAN port 3 in accordance with the Dynamic Host Configuration Protocol.

Normally, the IP pool (not shown) of the top-level router 4 has its network bits "192.168.1" different from that "192.168.2" of the IP pool 32 of the mid-level router 1. However, once after shut down and reboot, the top-level router 4 will have its IP pool be reset. It is then possible to have the new network bits of the IP pool of top-level router 4 the same with that of the IP pool 32 of the router 1. For example, if unfortunately the new network bits of the IP pool of top-level router 4 are "192.168.2", which is identical to the used network bits "192.168.2" of the IP pool 32 of the router 1, then the so-called domain conflict occurs.

In order to avoiding the domain conflict, the router 1 further includes a domain conflict prevention program 6. The program 6 is configured to perform a conflict prevention process 60 once the DHCP client 20 of the WAN port 2 obtains an IP address for the WAN IP address 21 from the top-level router 4. The conflict prevention process 60 includes the following steps:

In steps 200 and 202, the program 6 retrieves the network bits of the WAN IP address 21 and then the network bits of the IP pool 32 of the router 1. Next, in step 204, the program 6 compares and identifies whether the network bits of the WAN IP address 21 is identical to that of the IP pool 32. If yes, the network bits of the IP pool 32 together with a LAN IP address 31 will then be modified to be different from that of the WAN IP port 2, in step 206. Otherwise, if not, the process 60 will come to an end. Note that the LAN IP address 31 should be modified at the same time because it is selected from the IP pool 32. At least the network bits of the LAN IP address 31 should be changed to be the same with that of each IP addresses in the IP pool 32. After that, in step 208, an instruction will be transmitted to the client terminals associated with the LAN port 3 of the router 1.

Typically, the client terminals 5 are configured to request a new IP address from the DHCP server 30 of the router 1 in accordance with Dynamic Host Configuration Protocol upon reception of the instruction and then replace the original IP address with the new IP address. Therefore, the client terminals 5 will have their IP addresses being updated once the process 60 is finished.

According to the above, once the network bits of the WAN IP address 21 is found to be overlapped with that of the IP pool 32, the network bits of the IP pool 32 will be automatically modified to be different in advance. Accordingly, the process 60 ensures the client terminals 5 will always have the new IP addresses with their network bits different from that of the WAN IP address 21. In other words, it is impossible to have the same network bits between the top-level router 4 and the router 1, thereby avoiding the IP address conflict. Hence, the present invention is quite suitable to be applied on a network including three or more routers in order to avoid the IP address conflicts.

It will be appreciated that although a particular embodiment of the invention has been shown and described, modifications may be made. It is intended in the claims to cover such modifications which come within the spirit and scope of the invention.

The invention claimed is:

1. A router for connecting to a top-level DHCP server device and connecting with one or more client terminals, said router comprising:
  a wide area network (WAN) port connected to the top-level DHCP server device and having a DHCP client configured to request a lease of an IP address from the top-level DHCP server device in accordance with the Dynamic Host Configuration Protocol;

a local area network (LAN) port connected with the client terminals and having a LAN IP address, an IP pool, and a DHCP server, said DHCP server configured to allocate IP addresses from said IP pool to the client terminals in accordance with the Dynamic Host Configuration Protocol; and a domain conflict prevention program configured to execute the following steps whenever said DHCP client of said WAN port is given a lease of an IP address from said top-level DHCP server device for a WAN IP address of the WAN port:

retrieving network bits of said WAN IP address and network bits of said IP pool;

determining whether the network bits of said WAN IP address and the network bits of said IP pool are identical, and if yes, modifying the network bits of said IP pool together with said LAN IP address to be different from said WAN IP address, and then transmitting an instruction to all of said client terminals connected with said LAN port to ask each of said client terminals to request a lease of a new IP address from the DHCP server of the LAN port.

\* \* \* \* \*